United States Patent

[11] 3,609,327

[72] Inventors T. O. Paine
Administrator of the National Aeronautics and Space Administration with respect to an invention of;
Marvin Perlman, Granada Hill, Calif.
[21] Appl. No. 868,529
[22] Filed Oct. 22, 1969
[45] Patented Sept. 28, 1971

[54] FEEDBACK SHIFT REGISTER WITH STATES DECOMPOSED INTO CYCLES OF EQUAL LENGTH
9 Claims, 4 Drawing Figs.

[52] U.S. Cl. .......... 235/152, 340/146.1, 340/348
[51] Int. Cl. .......... H03k 1/00, G06f 11/00
[50] Field of Search .......... 235/168, 153, 152; 340/146.1, 345, 348; 179/15 AE, 15 BS

[56] References Cited
UNITED STATES PATENTS

| | | | |
|---|---|---|---|
| 3,162,837 | 12/1964 | Meggitt | 340/146.1 |
| 3,398,400 | 8/1968 | Rupp et al. | 340/146.1 |
| 3,155,818 | 11/1964 | Goetz | 235/153 |
| 3,471,830 | 10/1969 | McRae et al. | 340/146.1 |
| 3,475,724 | 10/1969 | Townsend et al. | 340/146.1 |
| 3,484,782 | 12/1969 | Schmidt | 340/348 |

*Primary Examiner*—Charles E. Atkinson
*Attorneys*—J. H. Warden, Paul F. McCaul and G. T. McCoy

ABSTRACT: A feedback shift register (FSR) comprising a shift register of $n$ stages, with the outputs of selected stages being mod-2 added in a feedback unit. The complement of the unit is fed back to the register's input stage. The number of outputs, which are fed back, is always odd, equaling a number which is one less than 2, raised to a number representing the number of 1's in the binary representation of $n$. The actual stages which are fed back are defined by the exponents of the terms X in the expansion of the term $(X+1)^n$. Such an FSR produces disjointed multistate cycles, each of a length $2^i$, where $2^{i-1} < n+1 \leq 2^i$.

MARVIN PERLMAN
*INVENTOR.*

BY

ATTORNEYS

FIG. 2

FEEDBACK CONNECTIONS FROM EXPANSION OF $(X+1)^n$

| n IN BINARY | $X^0$ | $X^1$ | $X^2$ | $X^3$ | $X^4$ | $X^5$ | $X^6$ | $X^7$ | $X^8$ | $X^9$ | $X^{10}$ | $X^{11}$ | $X^{12}$ | $X^{13}$ | $X^{14}$ | $X^{15}$ | $X^{16}$ | T |
|---|---|---|---|---|---|---|---|---|---|---|---|---|---|---|---|---|---|---|
| | | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | |
| 1 | 1 | 1 | | | | | | | | | | | | | | | | 1 |
| 10 | 1 | 0 | 1 | | | | | | | | | | | | | | | 1 |
| 11 | 1 | 1 | 1 | 1 | | | | | | | | | | | | | | 3 |
| 100 | 1 | 0 | 0 | 0 | 1 | | | | | | | | | | | | | 1 |
| 101 | 1 | 1 | 0 | 0 | 1 | 1 | | | | | | | | | | | | 3 |
| 110 | 1 | 0 | 1 | 0 | 1 | 0 | 1 | | | | | | | | | | | 3 |
| 111 | 1 | 1 | 1 | 1 | 1 | 1 | 1 | 1 | | | | | | | | | | 7 |
| 1000 | 1 | 0 | 0 | 0 | 0 | 0 | 0 | 0 | 1 | | | | | | | | | 1 |
| 1001 | 1 | 1 | 0 | 0 | 0 | 0 | 0 | 0 | 1 | 1 | | | | | | | | 3 |
| 1010 | 1 | 0 | 1 | 0 | 0 | 0 | 0 | 0 | 1 | 0 | 1 | | | | | | | 3 |
| 1011 | 1 | 1 | 1 | 1 | 0 | 0 | 0 | 0 | 1 | 1 | 1 | 1 | | | | | | 7 |
| 1100 | 1 | 0 | 0 | 0 | 1 | 0 | 0 | 0 | 1 | 0 | 0 | 0 | 1 | | | | | 3 |
| 1101 | 1 | 1 | 0 | 0 | 1 | 1 | 0 | 0 | 1 | 1 | 0 | 0 | 1 | 1 | | | | 7 |
| 1110 | 1 | 0 | 1 | 0 | 1 | 0 | 1 | 0 | 1 | 0 | 1 | 0 | 1 | 0 | 1 | | | 7 |
| 1111 | 1 | 1 | 1 | 1 | 1 | 1 | 1 | 1 | 1 | 1 | 1 | 1 | 1 | 1 | 1 | 1 | | 15 |
| 10000 | 1 | 0 | 0 | 0 | 0 | 0 | 0 | 0 | 0 | 0 | 0 | 0 | 0 | 0 | 0 | 0 | 1 | 1 |

MARVIN PERLMAN
*INVENTOR.*

BY [signature]
ATTORNEYS

EQUAL LENGTH CYCLES FOR n OF 2, 3, 4 & 5

| 1 2 3 4 5 | $a_k^5$ | 1 2 3 4 | $a_k^4$ | 1 2 3 | $a_k^3$ | 1 2 | $a_k^2$ |
|---|---|---|---|---|---|---|---|
| 0 0 0 0 0 | 1 | 0 0 0 0 | 1 | 0 0 0 | 1 | 0 0 | 1 |
| 1 0 0 0 0 | 0 | 1 0 0 0 | 1 | 1 0 0 | 0 | 1 0 | 1 |
| 0 1 0 0 0 | 1 | 1 1 0 0 | 1 | 0 1 0 | 0 | 1 1 | 0 |
| 1 0 1 0 0 | 0 | 1 1 1 0 | 1 | 0 0 1 | 0 | 0 1 | 0 |
| 0 1 0 1 0 | 0 | 1 1 1 1 | 0 | | | | |
| 0 0 1 0 1 | 0 | 0 1 1 1 | 0 | 1 1 1 | 0 | | |
| 0 0 0 1 0 | 0 | 0 0 1 1 | 0 | 0 1 1 | 1 | | |
| 0 0 0 0 1 | 0 | 0 0 0 1 | 0 | 1 0 1 | 1 | | |
| | | | | 1 1 0 | 1 | | |
| 1 1 1 1 1 | 0 | | | | | | |
| 0 1 1 1 1 | 1 | | | | | | |
| 1 0 1 1 1 | 0 | | | | | | |
| 0 1 0 1 1 | 1 | | | | | | |
| 1 0 1 0 1 | 1 | | | | | | |
| 1 1 0 1 0 | 1 | | | | | | |
| 1 1 1 0 1 | 1 | | | | | | |
| 1 1 1 1 0 | 1 | | | | | | |
| 0 0 1 1 0 | 0 | 0 1 0 1 | 0 | | | | |
| 0 0 0 1 1 | 1 | 0 0 1 0 | 1 | | | | |
| 1 0 0 0 1 | 1 | 1 0 0 1 | 0 | | | | |
| 1 1 0 0 0 | 0 | 0 1 0 0 | 1 | | | | |
| 0 1 1 0 0 | 1 | 1 0 1 0 | 1 | | | | |
| 1 0 1 1 0 | 1 | 1 1 0 1 | 0 | | | | |
| 1 1 0 1 1 | 0 | 0 1 1 0 | 1 | | | | |
| 0 1 1 0 1 | 0 | 1 0 1 1 | 0 | | | | |
| 1 1 0 0 1 | 1 | | | | | | |
| 1 1 1 0 0 | 0 | | | | | | |
| 0 1 1 1 0 | 0 | | | | | | |
| 0 0 1 1 1 | 1 | | | | | | |
| 1 0 0 1 1 | 0 | | | | | | |
| 0 1 0 0 1 | 0 | | | | | | |
| 0 0 1 0 0 | 1 | | | | | | |
| 1 0 0 1 0 | 1 | | | | | | |

FIG. 3

*INVENTOR.*
MARVIN PERLMAN

*BY* [signature]

ATTORNEYS

FEEDBACK SHIFT REGISTER WITH STATES DECOMPOSED INTO CYCLES OF EQUAL LENGTH

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to a shift register and, more particularly, to a novel family of shift registers with complementary mod-2 feedback.

2. Description of the Prior Art

The use of multistage shift registers in which the output of one stage or the combined output of several stages is fed back as the register's input is well known. These registers are generally referred to as feedback shift registers or FSR. Such registers are used to generate desired multibit codes, sometimes referred to as PN codes, which are used extensively in space data communication systems.

Herebefore, FSR's have been designed to fulfill specific requirements, without regard to the interrelationship between FSR's of different lengths, which if provided with feedbacks which are a function of their lengths result in a unique family of FSR's with unique characteristic features and advantages. It has been discovered that a unique family of FSR's exists with unique cyclic characteristics which are of significant advantages in applications other than data communication.

OBJECTS AND SUMMARY OF THE INVENTION

It is a primary object of the present invention to provide a unique family of FSR's.

Another object of the present invention is to provide a family of FSR's which is characterized by unique cyclic characteristics.

A further object of the present invention is the provision of a family of FSR's, each FSR having states which are decomposable into cycles of equal length.

Still a further object of the present invention is to provide novel FSR's, each providing cycles of lengths which are a function of the FSR's number of stages which can be odd or even.

These and other objects of the invention are achieved by providing a family of FSR's, each FSR in the family including a feedback unit to which the outputs of an odd number of stages are supplied. The stages always including the last stage. The feedback unit mod-2 adds the outputs supplied thereto and supplies the complement of the mod-2 addition as a feedback input to the FSR's first or input stage. By controlling the inputs to the feedback unit to be supplied from stages selected on the basis of the expansion of the term $(x+1)^n$ of the following characteristic polynomial:

$$f_1(x)=(x+1)\,(x+1)^n,$$

where $x$ is an indeterminant and $n$ represents the FSR's number of stages. The factor $(x+1)$ represents the complementation of the mod-2 addition by the feedback unit. When expanding the expression $(x+1)^n$, the exponents of the term $x$, represent the stages whose output should be fed as inputs to the feedback unit. FSR's so constructed produce equal length cycles which have unique characteristics and wide applications, as will be discussed hereafter in detail.

The novel features of the invention are set forth with particularity in the appended claims. The invention will best be understood from the following description when read in conjunction with the accompanying drawings.

BRIEF DESCRIPTION OF THE DRAWINGS

FIGS. 2 and 3 are charts useful in explaining the novel characteristics of the present invention.

DESCRIPTION OF THE PREFERRED EMBODIMENTS

Figure 1:
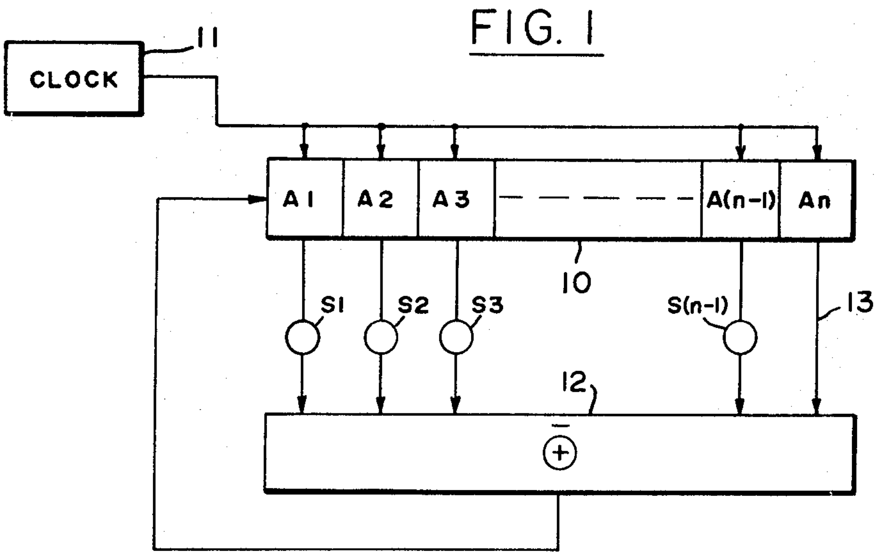
FIG. 1 is a block diagram of the novel feedback shift register of the present invention.

Reference is now made to FIG. 1 which is a generalized block diagram of any one of the FSR's of the present invention. In general terms, each FSR includes a multistage shift register 10, the stages being designated A1 through A$n$, where $n$ can be either odd or even. Each stage is assumed to be in either a binary 1 state or a binary 0 state. The stages are assumed to be set to an initial multistage state which represents an initial multibit word. Associated with the register 10 is a clock 11 which clocks the stages by means of clock pulses to shift the content or state of each stage to a succeeding stage in the register, in a manner well known in the art. An initial multibit state or word is assumed to be initially stored in the register by controlling each state to be in either a binary 1 or a binary 0 state.

The FSR includes a feedback unit 12, whose output is fed back, as the register's input signal, to the first or input stage A1. Unit 12 is always supplied with the output of the last stage A$n$, as represented by line 13. Depending on the value of $n$, the unit 12 may also be supplied with the outputs of other stages of register 10.

For explanatory purposes, the output of each of the stages A1-A($n$-1) is shown connected to unit 12 through a switch (such as S1), designated S, followed by its corresponding stage's numerical suffix (such as A1). It should be pointed out that the switches are shown in the generalized block diagram. However, in practice, for any register 10 of a fixed length, the connections are known so that the necessary stages are connected to unit 10 and the switches may be eliminated.

The unit 12 performs mod-2 addition on the inputs supplied thereto and provides the complement of the mod-2 addition to the input stage A1. The complement of the mod-2 addition is represented by $\overline{\oplus}$.

In accordance with the teachings of the present invention, the number of inputs or taps to the unit 12 is always odd, irrespective of the number of stages $n$. It has been discovered that the number of taps $T$ may be expressed as, $$T=2^{\omega}-1$$

where $\omega$ represents the number of binary 1's in the binary representation of $n$. For example, if $n$ is 6, since its binary representation is 110, comprising two 1's, $T=2^2-1=4-1=3$. If $n=8$, its binary representation is 1000. Consequently, $T=2^1-1=2-1=1$.

While the number of taps is always odd and may 2 expressed as a function of the number of 1's in the binary representation of $n$, the actual stages which are fed back are a function of the exponents of the terms $X$ in the expansion of the factor $(X+1)^n$, in the polynomial $$f_1(X)=(X+1)\,(X+1)^n.$$

The factor $x+1$ is a result of complementary nod-2 addition. Basically, the stages which are fed to unit 12 are represented by the exponents of $x$ in the expanded expression of $(X+1)^n$. Actually, the expansion of this factor results in an even number of terms for all $n$'s. However, one term is the constant term 1, which for feedback determination purposes is ignored. Hence, the number of feedback connections or taps is always odd.

The following may best be highlighted by one or two examples. Assuming $n=7$, $(X+1)^7=(X+1)^4(X+1)^2(X+1)$. Based on mod-2arithmetic, $$(X+1)^7=(X^4+1)\,(X^2+1)\,(X+1)$$
$$=(X^6+X^4+X^2+1(X+1)$$
$$=X^7+X^6+X^5+X^4+X^3+X^2+X^1+1.$$

Therefrom it is that since the $X$ exponents include the numbers 1 through 7, for a seven-stage ($n=7$) FSR, the output of each stage is fed back to unit 12, for a total of seven taps. That seven taps are required is further evident from the binary representation 111 of the number 7. Such a representation contains three 1's. Thus $T=2^3-=8-1=7$. On the other hand, if $n=13$, $$(X+1)^{13}=(X+1)^8(X+1)^4(X+1)$$
$$=(X^8+1(X^4+1)(x1)$$
$$=(X^{12}+X^8+X^4+1)(X+1)$$
$$=X^{13}+X^{12}+X^9+X^8+X^5+X^4+X^1+1.$$

Hence, only the outputs of the 13th stage, representing the last stage and the outputs of the 12th, the ninth, the eighth, the fifth, the fourth and the first stages are fed back, for a total of seven taps. The number of taps of seven is apparent from the binary representation of 13 which contains three 1's. Therefore, $T=2^3-1=7$.

FIG. 2 to which reference is made herein is a chart, listing the terms of the expansion of $(X+1)^n$, for $n$ from 1 to 16. In FIG. 2, the right-hand column lists the number of taps for each of the 16 different FSR's, and the left-hand column lists the binary representations of $n$. The middle column designates the various taps which have to be fed back, the taps being designated from $C_1$–$C_{16}$. Although the table is limited to an $n$ up to 16, it should be pointed out that the aforedescribed teachings are applicable to $n$ of any value, in which $n$ is an integer.

It has been discovered that the states of each FSR of the present invention are divided into equal-length cycles, with the length of each cycle being $2^i$ when the following inequalities are satisfied:

$$2^{i-1}<n+1\leq 2^i.$$

FIG. 3 to which reference is now made is a chart listing equal-length cycles for FSR's of two, three, four and five stages, with different initial conditions or states. The lines under various numbers in the top row designates the stages whose outputs are fed back to the feedback unit. Directing special attention to the left-hand column of FIG. 3, it should be noted that complementary states such as 00000 and 11111 or 00110 and 11001 lie in disjointed separate cycles. The occurrence of complementary states in disjointed cycles is also shown in the column in which two cycles of the three-stages FSR are diagrammed.

This property, i.e., the occurrence of complementary states in disjointed cycles is characteristic of any FSR of the present invention in which $n$ is other than a power of 2. On the other hand, each FSR having a number of stages which is a power of 2, such as the two and four stages shown in FIG, 3, is characterized by cycles in which complementary states appear 180° apart. Thus, one half of each cycle is the complement of the other half. As seen from FIG. 3, for the four-stage register, the top half of the top cycle starting with 00000 is the complement of the state 11111 which starts the cycle bottom half. A similar half-cycle complementary arrangement is shown in the single cycle for the two-stage FSR. It should further be pointed out that irrespective of the number of stages any word or state in any of the cycles, produced by any particular FSR of the present invention appears in one cycle only and in no other.

It should be appreciated by those familiar with the art that due to the novel characteristics of the disjointed cycles, provided by any of the FSR's of the present invention, advantage may be taken of such characteristics in many different applications. Among such applications are included the following:

1. Encoding and decoding of nongroup error-detecting and error-correcting codes; 2. Filing and retrieving blocks of categorized binary data in a memory bank;
3. Synthesis of feedback shift registers with a prescribed cycle length by introducing nonlinear terms in the feedback function which result in cycle joining and/or cycle splitting;
4. Associative memory application where binary date is addressed according to its content (i.e., which FSR cycle it belongs);
5. Sector addressing and paging application of large-sale memories.

From the inequality.

$$2^{i-1}<n+1\leq 2^i,$$

it should be appreciated that cycles of the same length are producable by FSR's of several different values of $n$. For example, when $i=3$, an eight-state cycle is produced by an FSR of four, five, six or seven stages. Likewise, when $i=4$, 16-state cycles are produced by any FSR whose $n$ is not less than 8 and not more than 15.

A careful study of FIG. 2 reveals that the minimum number of required taps, namely one tap, is required whenever $n$ equals a number which is a power of 2, such as for example when $n$ equals $2^2$, $2^3$, $2^4$, etc. On the other hand, all the stages are fed back when $n$ is one less than a number which is a power of 2, such as $2^2-1=3$, $2^3-1=7$, $2^4-1=15$, etc. In practice, the choice of $n$ may depend on the desired cycle length and/or the word length. If the cycle length is the only factor of importance, $n$ should be chosen to be a number which equals a power of 2, yet satisfies the aforestated inequality. This results in a minimum number of stages with a single tap which is fed back. If, however, the word length is fixed, the number of stages is chosen to correspond to the required word length.

Figure 4:
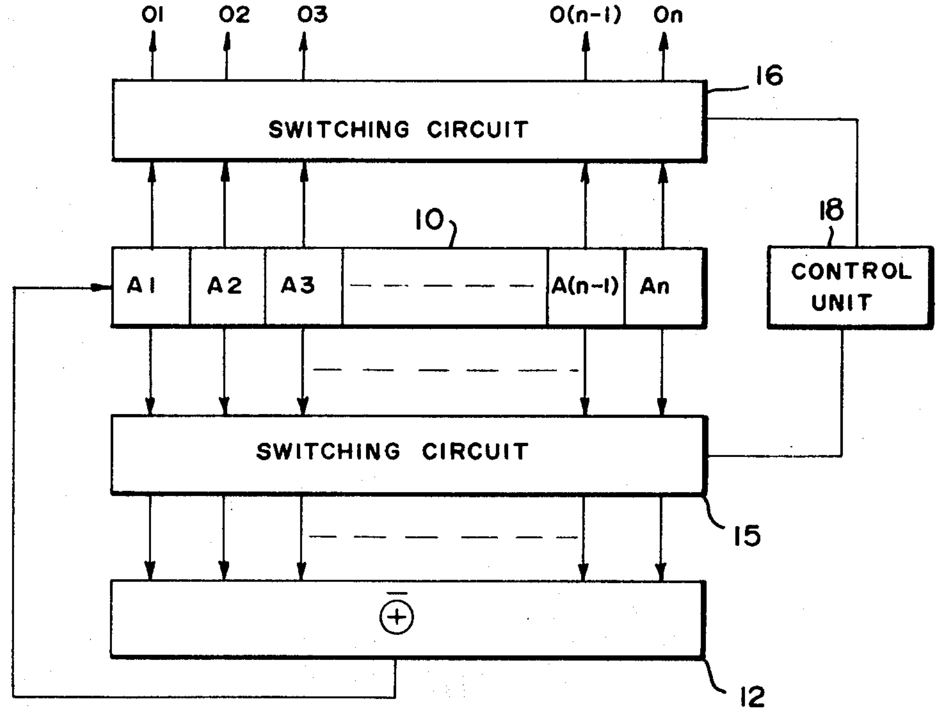
FIG. 4 is a block diagram of another embodiment of the invention.

Reference is now made to FIG. 4, which is a most general block diagram of an FSR, constructed in accordance with the present invention. Therein, elements, similar to those herebefore described, are designated by like numerals. Basically in FIG. 4, the outputs of stages A1–An of register 10 are supplied to the feedback unit 12 through a switching circuit 15, while output lines 01–0n are connected to the stages' output through a switching circuit 16. The circuits 15 and 16 are assumed to be controlled by a control unit 18. Basically, by controlling the stages' outputs, which are supplied to unit 12 through circuit 15, the performance of the FSR is controlled. The circuit 16 on the other hand may be used to control the FSR readout to be in parallel or in series.

For example, if a six-stage FSR is desired, the control unit 18 would control circuit 15 to supply feedback unit 12 only with the outputs of stages A2, A4 and A6, If parallel readout is desired, stages A1—A6 are coupled to output lines 01–06 by means of circuit 16. On the other hand if serial readout is desired, only the output of stage A6 is supplied to output line 06, and the connections to all the other output lines are deactivated or disabled.

It should be appreciated that various known circuit-design techniques may be used in the implementation of the switching circuits 15 and 16, and control unit 18, which are therefore shown in block form. For example, solid-state logic elements may be used to act as gates between the stages of register 10 and the feedback unit 12 and the output lines 01–0n. The control unit 18 may be used to activate only selected ones of these gates, to control which stages are fed back to unit 12, and which stages are read out.

Although particular embodiments of the invention have been described and illustrated herein, it is recognized that modifications and variations may readily occur to those skilled in the art and consequently it is intended that the claims be interpreted to cover such modification and equivalents.

What is claimed is:

1. A feedback shift register comprising:

a shift register of $n$ stages arranged in a sequence with the first stage in said sequence representing an input stage, each stage being in either a binary 1 state or a binary 0 state and capable of providing an output indicative of its state;

mod-2 adding means coupled to $y$ selected stages of said register, for providing an output representing the complement of the mod-2 addition of the outputs of said $y$ stages, $y\leq n$ and $y$ being always odd and comprising stages in said sequence which correspond to exponents of terms $X$ in the expansion of the expression $(X+1)^n$; and means for for directly supplying the output of said mod-2 adding means to the input stage of said shift register.

2. The arrangement as recited in claim 1 wherein $n$ is not equal to a power of 2 and whereby the outputs of said $n$ stages define disjointed multiword cycles, where complementary words appear in different cycles, each cycle including $2^i$ words, where $i$ and $n$ are related by the expression $2^{i-1}<n+\leq 2^i$.

3. The arrangement as recited in claim 1 wherein $n$ is equal to a power of 2 and the outputs of said $n$ stages define multiword cycles, where complementary words appear in the same cycle, 180° apart, and each cycle includes $2^i$ words where $n$ and $i$ are related by the expression, $2^{i-1}<n+1\leq 2^i$.

4. The arrangement as recited in claim 1 wherein the output of the highest order stage in said shift register is connected to said mod-2 adding means.

5. The arrangement as recited in claim 1 wherein the outputs of said $n$ stages define multiword cycles, each cycle comprising $2^i$ words, where $i$ and $n$ are related by the expression $2^{i-1}<n+1\leq 2^i$.

6. A feedback shift register comprising:

a shift register of $n$ stages arranged in a sequence with the first stage in said sequence representing an input stage and the stage opposite said input stage in said sequence representing a last stage, each stage being in either a binary 1 state or a binary 0 state and capable of providing an output indicative of its state;

mod-2 adding means coupled to $y$ selected stages of said register for providing an output representing the complement of the mod-2 addition of the outputs of said $y$ stages, said $y$ stages including the last stage, $y<n$, $y$ equaling 1 less than 2 raised to the power of a number which represents the number of 1's in the binary representation of $n$; and means for supplying the output of said mod-2 adding means to the input of the input stage of said shift register.

7. The arrangement as recited in claim 6 wherein the $y$ stages which are connected to said mod-2 adding means comprise stages in said sequence which correspond to exponents of terms $X$ in the expansion of the expression $(X+1)^n$, in which each expanded expression $(X+1)^n$, in which each expanded expression $(X+1)^r=X^r+1$, where $r$ is a power of 2.

8. The arrangement as recited in claim 7 wherein $n$ is not equal to a power of 2 and whereby the outputs of said $n$ stages define disjointed multiword cycles, where complementary words appear in different cycles, each cycle including $2^i$ words, where $i$ and $n$ are related by the expression $2^{i-1}<n+1<2^i$.

9. The arrangement as recited in claim 7 wherein $n$ is equal to a power of 2 and the outputs of said $n$ stage define multiword cycles, where complementary words appear in the same cycle, 180°apart, and each cycle includes $2^i$ words where $n$ and $i$ are related by the expression, $2^{i-1}<n+1<2^i$.